US012752298B2

(12) United States Patent
Ulloa

(10) Patent No.: US 12,752,298 B2
(45) Date of Patent: Oct. 6, 2026

(54) CAULK NOZZLE LIGHTING SYSTEM

(71) Applicant: Rene Ulloa, Kansas City, MO (US)

(72) Inventor: Rene Ulloa, Kansas City, MO (US)

( * ) Notice: Subject to any disclaimer, the term of this patent is extended or adjusted under 35 U.S.C. 154(b) by 126 days.

(21) Appl. No.: 18/781,164

(22) Filed: Jul. 23, 2024

(65) Prior Publication Data

US 2026/0027582 A1 Jan. 29, 2026

(51) Int. Cl.

| | |
|---|---|
| ***B05C 17/01*** | (2006.01) |
| ***B05C 17/005*** | (2006.01) |
| ***F21L 4/08*** | (2006.01) |
| ***F21V 23/04*** | (2006.01) |
| ***F21V 33/00*** | (2006.01) |
| ***F21W 111/10*** | (2006.01) |
| ***F21W 131/403*** | (2006.01) |
| ***F21Y 107/30*** | (2016.01) |
| ***F21Y 115/10*** | (2016.01) |

(52) U.S. Cl.

CPC ................ *B05C 17/01* (2013.01); *F21L 4/08* (2013.01); *F21V 23/0414* (2013.01); *F21V 33/0084* (2013.01); *B05C 17/0052* (2013.01); *F21W 2111/10* (2013.01); *F21W 2131/403* (2013.01); *F21Y 2107/30* (2016.08); *F21Y 2115/10* (2016.08)

(58) Field of Classification Search

CPC ........ B05C 17/01; B05C 17/0052; F21L 4/08; F21W 2111/10; F21W 2131/403; F21V 23/0414; F21V 33/0084; F21Y 2107/30; F21Y 2115/10

USPC .................................. 222/326; 362/119, 120

See application file for complete search history.

(56) References Cited

U.S. PATENT DOCUMENTS 4,291,839 A 9/1981 Brett
5,369,555 A * 11/1994 McKain .................. B25B 23/18 362/120
5,875,920 A * 3/1999 Parent ..................... B05C 17/01 222/391
6,511,201 B1 1/2003 Elrod
8,016,048 B2 9/2011 Ueda
9,238,246 B2 1/2016 Surratt
11,351,564 B1 6/2022 Drewett
D962,026 S 8/2022 Yang
11,738,365 B2 8/2023 Smith
2002/0105796 A1* 8/2002 Naghi ................. F21V 33/0084 362/120
2002/0105797 A1* 8/2002 Navid ................. F21V 33/0084 362/120
2009/0101673 A1* 4/2009 Alioto ................. B05C 17/0103 222/113
2017/0192269 A1 7/2017 Ma

FOREIGN PATENT DOCUMENTS

WO WO9602459 2/1996

* cited by examiner

*Primary Examiner* — David J Walczak

(57) ABSTRACT

A caulk nozzle lighting system for lighting a nozzle of a caulk cartridge and an adjacent work area includes a caulk gun which has a cartridge holder with a front wall, a back wall, and a perimeter wall. The perimeter wall is coupled to and extends between the front wall and the back wall. The cartridge holder defines a bay for accommodating the caulk cartridge surrounded by the front wall, the back wall, and the perimeter wall. A lighting assembly is mounted to the front wall of the cartridge holder of the caulk gun and is configured to emit light forwardly with respect to the front wall.

10 Claims, 6 Drawing Sheets

CAULK NOZZLE LIGHTING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tool lighting systems and more particularly pertains to a new tool lighting system for lighting a nozzle of a caulk cartridge and an adjacent work area.

(2) Description of Related Art Including Information Disclosed Under 37 CFR 1.97 and 1.98

The prior art relates to tool lighting systems. Various tools have had lights incorporated into them to facilitate better viewing of the tool or a work piece engaged by the tool. However, the prior art fails to describe a caulking gun which has lighting which illuminates a nozzle of a caulk cartridge loaded into the caulking gun. The prior art further fails to disclose such an apparatus in which the lighting system illuminates multiple sides of the nozzle such that a user may view the nozzle and work area from multiple different angles while keeping the nozzle and work area illuminated.

BRIEF SUMMARY OF THE INVENTION

An embodiment of the disclosure meets the needs presented above by generally comprising a caulk gun which has a cartridge holder with a front wall, a back wall, and a perimeter wall. The perimeter wall is coupled to and extends between the front wall and the back wall. The cartridge holder defines a bay for accommodating a caulk cartridge surrounded by the front wall, the back wall, and the perimeter wall. A lighting assembly is mounted to the front wall of the cartridge holder of the caulk gun and is configured to emit light forwardly with respect to the front wall.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
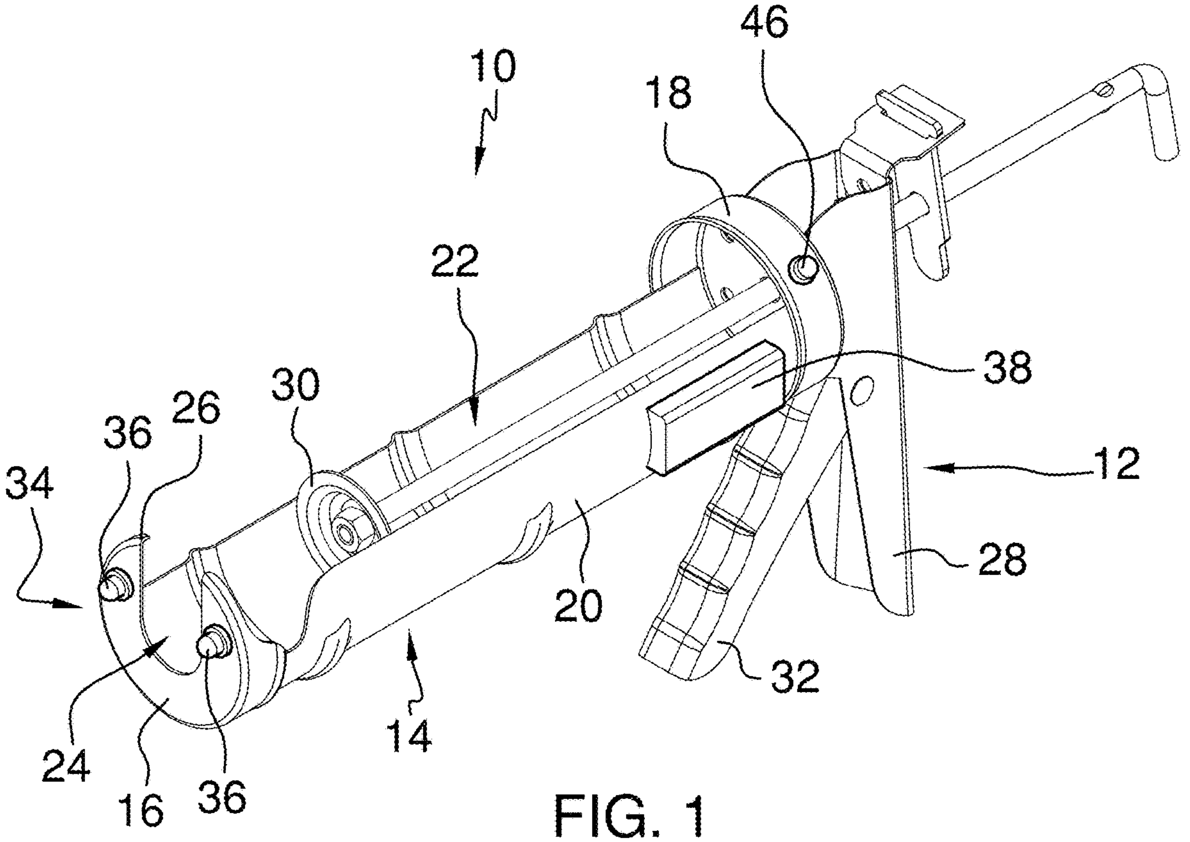
FIG. 1 is a front perspective view of a caulk nozzle lighting system according to an embodiment of the disclosure.
Figure 2:
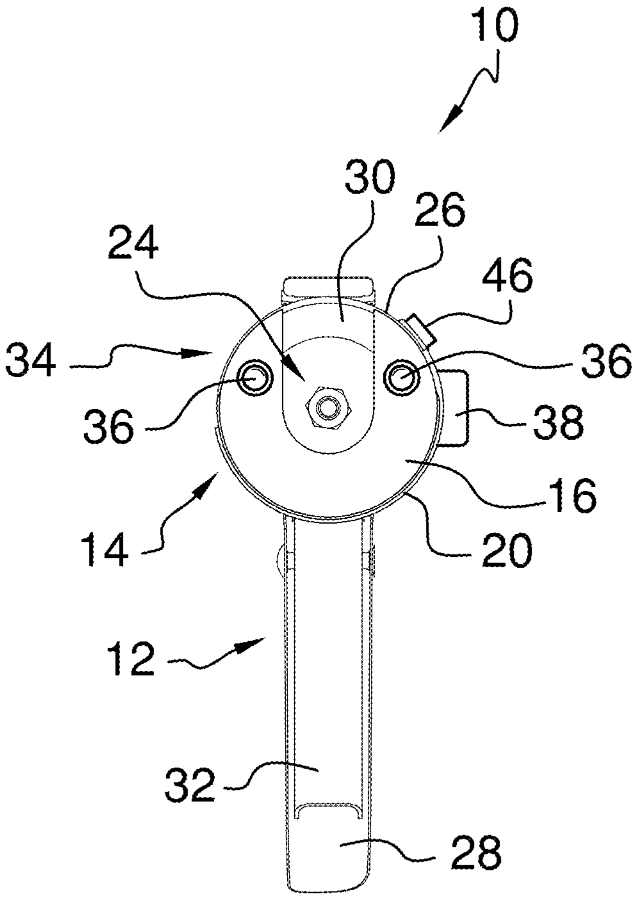
FIG. 2 is a front view of an embodiment of the disclosure.
Figure 3:
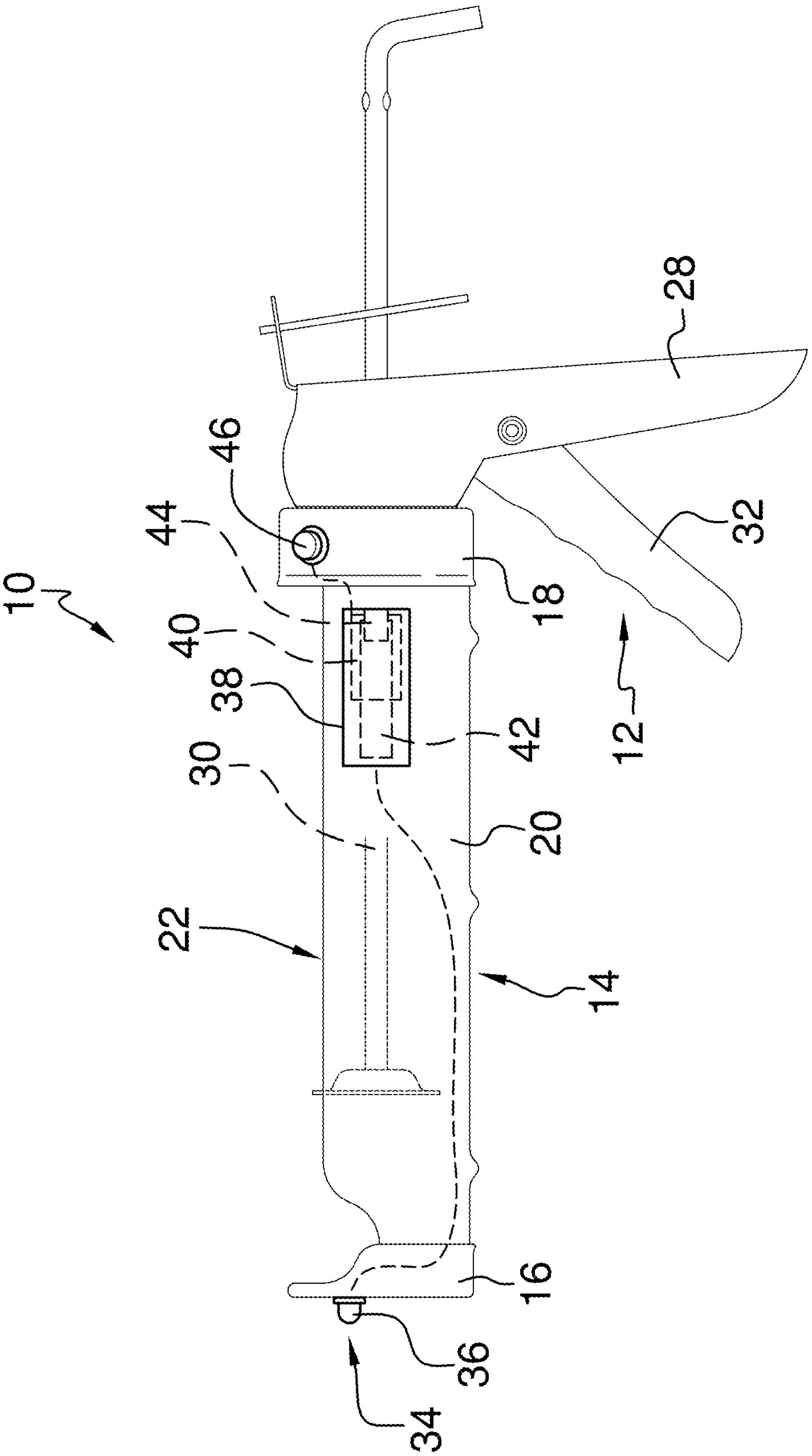
FIG. 3 is a side view of an embodiment of the disclosure.
Figure 4:
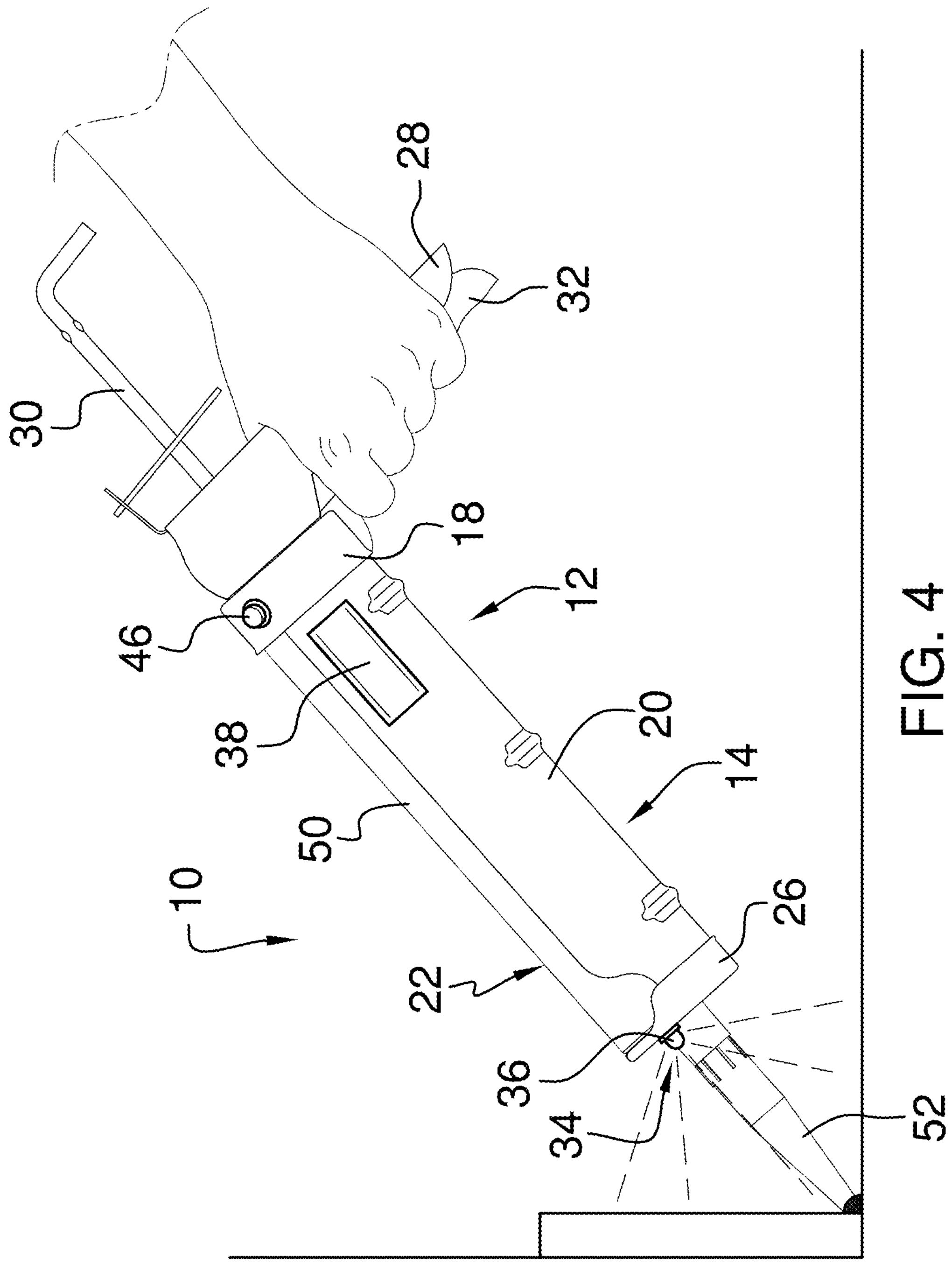
FIG. 4 is an in-use view of an embodiment of the disclosure.
Figure 5:
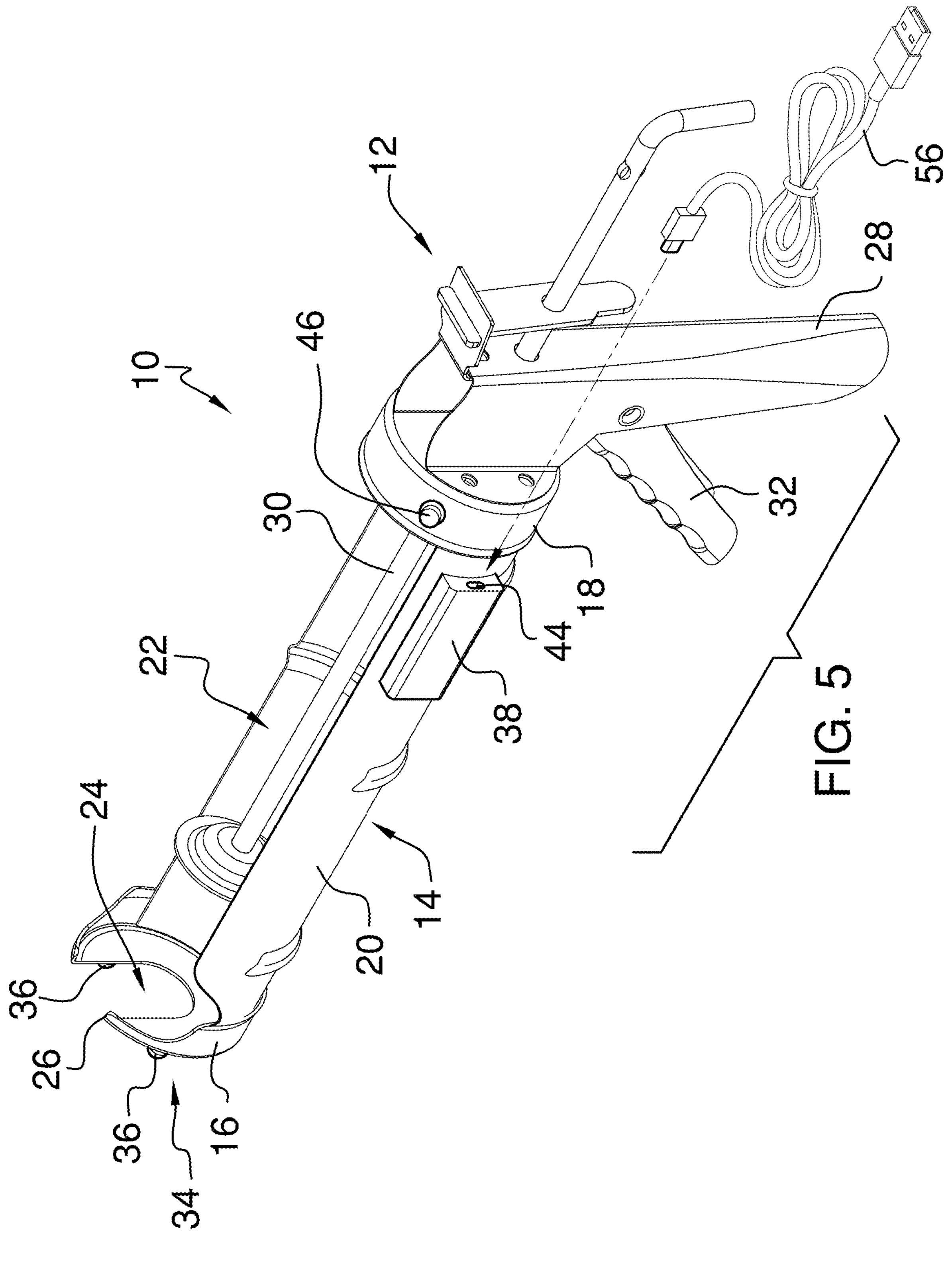
FIG. 5 is a rear perspective view of an embodiment of the disclosure.
Figure 6:
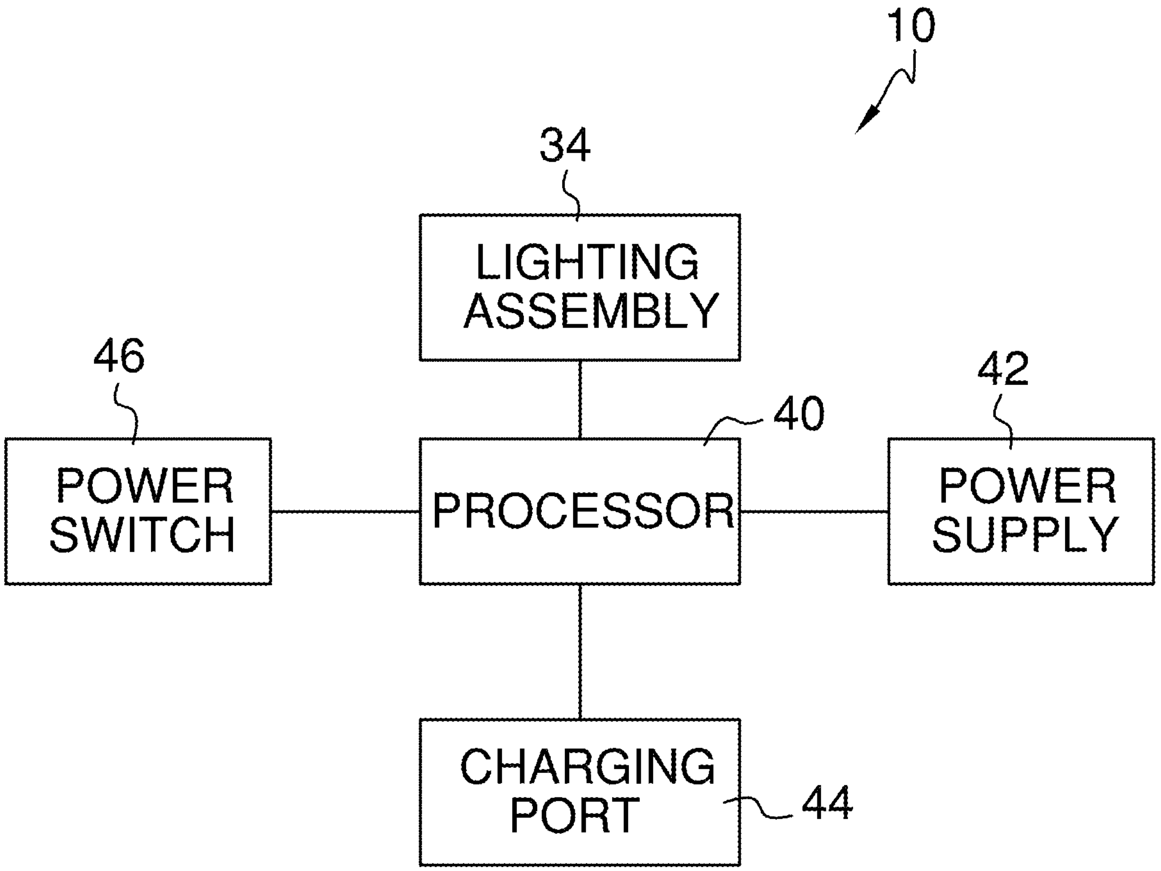
FIG. 6 is a block diagram of an embodiment of the disclosure.

With reference now to the drawings, and in particular to FIGS. 1 through 6 thereof, a new tool lighting system embodying the principles and concepts of an embodiment of the disclosure and generally designated by the reference numeral 10 will be described.

As best illustrated in FIGS. 1 through 6, the caulk nozzle lighting system 10 generally comprises a caulk gun 12 which has a cartridge holder 14 for holding a caulk cartridge 50. The caulk cartridge 50 has a nozzle 52 for dispensing caulk and a piston (not shown) positioned opposite the nozzle 52 which may be moved toward the nozzle 52 to force the caulk through the nozzle 52. The caulk gun 12 may be used with cartridges of similar shape which hold other substances. The cartridge holder 14 has a front wall 16, a back wall 18, and a perimeter wall 20. The perimeter wall 20 is coupled to and extends between the front wall 16 and the back wall 18. The cartridge holder 14 defines a bay 22 for accommodating the caulk cartridge 50 which is surrounded by the front wall 16, the back wall 18, and the perimeter wall 20. The bay 22 has an open top for receiving the caulk cartridge 50. The front wall 16 defines a slot 24 which is positioned and configured to receive the nozzle 52 of the caulk cartridge 50. The slot 24 is open at a top side 26 of the front wall 16.

The caulk gun 12 also has a handle 28 which is attached to the back wall 18 of the cartridge holder 14 and extends generally perpendicularly to a central axis of the cartridge holder 14 which extends between the front wall 16 and the back wall 18. A plunger 30 extends through the back wall 18 and is slidable along the central axis of the cartridge holder 14 such that the plunger 30 may be urged into the piston of the caulk cartridge 50 to force the caulk to dispense through the nozzle 52. A trigger 32 is pivotally mounted to the handle 28. The trigger 32 engages the plunger 30 such that, when the trigger 32 is pulled toward the handle 28, the plunger 30 is moved toward the front wall 16 of the cartridge holder 14.

A lighting assembly 34 is mounted to the front wall 16 of the cartridge holder 14 of the caulk gun 12. The lighting assembly 34 comprises a pair of light sources 36 which are positioned opposite each other across the slot 24 of the front wall 16. In other embodiments, the lighting assembly 34 may have other arrangements of light sources 36 in which the light sources 36 are positioned to emit light forwardly from the front wall 16 of the cartridge holder 14 from one or more sides of the nozzle 52. Each light source 36 of the pair of light sources 36 comprises a light-emitting diode but may comprise a fluorescent lamp, an incandescent lamp, or any other suitable light emitter.

A housing 38 is mounted to the caulk gun 12 and is positioned on an exterior of the cartridge holder 14. A processor 40 is mounted in the housing 38 and is operatively coupled to the lighting assembly 34. A power supply 42 comprising a battery is mounted in the housing 38 and is electrically coupled to the processor 40. The power supply 42 may comprise a capacitor or other energy storage device in other embodiments. A charging port 44 is mounted to the housing 38 and is electrically coupled to the power supply 42. The charging port 44 may be electrically coupled to an external power source via a charging cord 56 to charge the power supply 42. A power switch 46 is mounted to the back wall 18 of the cartridge holder 14 and is operatively coupled to the lighting assembly 34. The power switch 46 is operable to alternately activate and deactivate the lighting assembly 34. When the lighting assembly 34 is activated, the power supply 42 is electrically coupled to the lighting assembly 34. The processor 40 may sense a connection to the external power source via the charging port 44 and electrically couple the external power source to the power supply 42 to charge the power supply 42.

In use, the caulk cartridge 50 is loaded into the bay 22 of the cartridge holder 14 with the nozzle 52 extending through the slot 24. The lighting assembly 34 is activated to illuminate areas forward of the front wall 16 of the cartridge holder 14 from multiple sides of the nozzle 52. The caulk gun 12 is then used to dispense caulk. The lighting assembly 34 facilitates the user in seeing work areas where caulk is being dispensed, especially in underlit areas. The lighting system illuminates the work areas from multiple angles such that areas in which light from the lighting system is blocked by the nozzle 52 are minimized.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A caulk nozzle lighting system comprising:

a caulk gun, the caulk gun comprising a cartridge holder, the cartridge holder having a front wall, a back wall, and a perimeter wall, the perimeter wall being coupled to and extending between the front wall and the back wall, the cartridge holder defining a bay for accommodating a caulk cartridge surrounded by the front wall, the back wall, and the perimeter wall; and a lighting assembly mounted to the front wall of the cartridge holder of the caulk gun, the lighting assembly being configured to emit light forwardly with respect to the front wall;

wherein the front wall defines a slot positioned and configured to receive a nozzle of the caulk cartridge; and wherein the lighting assembly comprises a pair of light sources, the light sources being positioned opposite each other across the slot of the front wall such that a nozzle extending from the caulk cartridge is aligned with the pair of lights sources.

2. The system of claim 1, wherein the bay has an open top for receiving the caulk cartridge.

3. The system of claim 1, wherein the slot is open at a top side of the front wall.

4. The system of claim 1, wherein the lighting assembly comprises a pair of light sources, the light sources being positioned and configured to be opposite each other across a nozzle of the caulk cartridge.

5. The system of claim 4, wherein each light source of the pair of light sources comprises a light-emitting diode.

6. The system of claim 1, further comprising:

a processor operatively coupled to the lighting assembly; and a power supply electrically coupled to the processor.

7. The system of claim 6, wherein the power supply comprises a battery.

8. The system of claim 6, further comprising a charging port electrically coupled to the power supply.

9. The system of claim 6, further comprising a power switch operatively coupled to the lighting assembly, the power switch being operable to alternately activate and deactivate the lighting assembly, the power switch being mounted to the cartridge holder.

10. A caulk nozzle lighting system comprising:

a caulk gun, the caulk gun comprising a cartridge holder, the cartridge holder having a front wall, a back wall, and a perimeter wall, the perimeter wall being coupled to and extending between the front wall and the back wall, the cartridge holder defining a bay for accommodating a caulk cartridge surrounded by the front wall, the back wall, and the perimeter wall, the bay having an open top for receiving the caulk cartridge, the front wall defining a slot positioned and configured to receive a nozzle of the caulk cartridge, the slot being open at a top side of the front wall;

a lighting assembly mounted to the front wall of the cartridge holder of the caulk gun, the lighting assembly being configured to emit light forwardly with respect to the front wall, the lighting assembly comprising a pair of light sources, the light sources being positioned opposite each other across the slot of the front wall such that a nozzle extending from the caulk cartridge is aligned with the pair of lights sources, each light source of the pair of light sources comprising a light-emitting diode;

a housing mounted to the caulk gun, the housing being positioned on an exterior of the cartridge holder;

a processor mounted in the housing and operatively coupled to the lighting assembly;

a power supply mounted in the housing and electrically coupled to the processor, the power supply comprising a battery;

a charging port mounted to the housing and electrically coupled to the power supply; and a power switch operatively coupled to the lighting assembly, the power switch being operable to alternately activate and deactivate the lighting assembly, the power switch being mounted to the cartridge holder.

* * * * *